(12) United States Patent
Yamada et al.

(10) Patent No.: US 10,427,683 B2
(45) Date of Patent: Oct. 1, 2019

(54) VEHICLE DISPLAY DEVICE AND VEHICLE DISPLAY METHOD FOR DISPLAYING IMAGES

(71) Applicant: JVC KENWOOD Corporation, Yokohama-shi, Kanagawa (JP)

(72) Inventors: Yasuo Yamada, Yokohama (JP); Ichiro Ishida, Yokohama (JP)

(73) Assignee: JVC KENWOOD Corporation, Saitama (JP)

( * ) Notice: Subject to any disclaimer, the term of this patent is extended or adjusted under 35 U.S.C. 154(b) by 0 days.

(21) Appl. No.: 15/845,267

(22) Filed: Dec. 18, 2017

(65) Prior Publication Data

US 2018/0105173 A1 Apr. 19, 2018

Related U.S. Application Data

(63) Continuation of application No. PCT/JP2016/066186, filed on Jun. 1, 2016.

(30) Foreign Application Priority Data

Aug. 27, 2015 (JP) .................................. 2015-167709
Dec. 28, 2015 (JP) .................................. 2015-257083

(51) Int. Cl.
- *B60W 30/165* (2012.01)
- *G06T 3/40* (2006.01)
- *G08G 1/16* (2006.01)
- *B60K 35/00* (2006.01)
- *B60R 1/00* (2006.01)

(Continued)

(52) U.S. Cl.
CPC ........... *B60W 30/165* (2013.01); *B60K 35/00* (2013.01); *B60R 1/00* (2013.01); *G02B 27/01* (2013.01); *G02F 1/133* (2013.01); *G06T 3/4038* (2013.01); *G08G 1/0968* (2013.01); *G08G 1/16* (2013.01); *G08G 1/168* (2013.01); *H04N 7/18* (2013.01); *H04N 7/181* (2013.01); *B60R 2300/607* (2013.01); *G02B 2027/014* (2013.01);

(Continued)

(58) Field of Classification Search
USPC .......................................................... 701/49
See application file for complete search history.

(56) References Cited

U.S. PATENT DOCUMENTS

2006/0129292 A1* 6/2006 Ohkubo ................ B60W 50/14
701/38
2006/0190147 A1* 8/2006 Lee ..................... B62D 15/0275
701/26

(Continued)

FOREIGN PATENT DOCUMENTS

JP 2012217000 A 11/2012

*Primary Examiner* — Tyler D Paige
(74) *Attorney, Agent, or Firm* — Brundidge & Stanger, P.C.

(57) ABSTRACT

An image acquisition unit acquires an image around a vehicle. A distance acquisition unit acquires a distance to a first object included in the acquired image. An image processing unit processes the image such that a distance to a second object located beneath the first object included in the acquired image is reflected, in accordance with the acquired distance. A viewpoint transformation processing unit subjects the processed image to viewpoint transformation to produce an image as viewed from above the vehicle. A display processing unit causes a display unit to display the image subjected to transformation.

11 Claims, 17 Drawing Sheets

(51) Int. Cl.
  *H04N 7/18*    (2006.01)
  *G02B 27/01*   (2006.01)
  *G02F 1/133*   (2006.01)
  *G08G 1/0968*  (2006.01)

(52) U.S. Cl.
  CPC ............. *G02B 2027/0138* (2013.01); *G02B 2027/0141* (2013.01); *G02B 2027/0183* (2013.01)

(56) References Cited

U.S. PATENT DOCUMENTS

| | | | |
|---|---|---|---|
| 2007/0003108 A1* | 1/2007 | Chinomi | B60R 1/00 382/104 |
| 2009/0122140 A1 | 5/2009 | Imamura | |
| 2009/0303024 A1 | 12/2009 | Asari | |
| 2010/0171828 A1* | 7/2010 | Ishii | B60R 1/00 348/135 |
| 2010/0329510 A1* | 12/2010 | Schmid | B62D 15/0275 382/103 |
| 2012/0062743 A1* | 3/2012 | Lynam | B60Q 9/005 348/148 |
| 2013/0155241 A1* | 6/2013 | Tanuki | B60R 1/00 348/148 |
| 2013/0191022 A1* | 7/2013 | Mathes | G01C 21/367 701/532 |
| 2018/0105173 A1* | 4/2018 | Yamada | B60R 1/00 |

\* cited by examiner

VEHICLE DISPLAY DEVICE AND VEHICLE DISPLAY METHOD FOR DISPLAYING IMAGES

CROSS-REFERENCE TO RELATED APPLICATION

This application is a Continuation of International Application No. PCT/JP2016/066186, filed on Jun. 1, 2016, which in turn claims the benefit of priority from the prior Japanese Patent Application No. 2015-167709, filed on Aug. 27, 2015, and Japanese Patent Application No. 2015-257083, filed on Dec. 28, 2015, the entire contents of which are incorporated herein by reference.

BACKGROUND

1. Field

The present invention relates to a display technology for vehicles and, in particular, to a vehicle display device and a vehicle display method for displaying images.

2. Description of the Related Art

A camera may be provided at a plurality of locations in a vehicle. A bird's-eye view is produced by transforming the viewpoints of the captured images and merging the images (see, for example, patent document 1).

[patent document 1] JP2012-217000

With viewpoint transformation, it is not possible to represent a distance between objects located at different vertical positions accurately. This may create uncomfortableness or inability to know a distance to an object accurately. For example, when a vehicle is driven backward to park at a parking lot in a parking area where a plurality of vehicles are parked in arrays, and if a parking frame border is immediately beneath the end of the vehicle behind, an image subjected to viewpoint transformation may look as if there is a distance between the frame border and the vehicle behind. In the frame border immediately beneath the end of the vehicle behind is the frame border indicating the parking range for the driver's vehicle, one cannot know the distance to the vehicle behind properly.

SUMMARY

To address the aforementioned issue, a vehicle display device according to an embodiment comprises: an image acquisition unit that acquires an image around a vehicle; a distance acquisition unit that acquires a first distance between a first object included in the image acquired in the image acquisition unit and the vehicle; an image processing unit that processes the image image such that a distance to a second object located beneath the first object included in the image acquired in the image acquisition unit is reflected, in accordance with the first distance acquired in the distance acquisition unit; a viewpoint transformation processing unit that subjects the image to viewpoint transformation to produce a bird's-eye image as viewed from above the vehicle; and a display control unit that causes a display unit to display the bird's-eye image produced in the viewpoint transformation processing unit.

Another embodiment relates to a vehicle display method. The method comprises: acquiring an image around a vehicle; acquiring a first distance between a first object included in the acquired image and the vehicle; processing an image such that a distance to a second object located beneath the first object included in the acquired image is reflected, in accordance with the acquired first distance; subjecting the image to viewpoint transformation to produce a bird's-eye image as viewed from above the vehicle; and causing a display unit to display the produced bird's-eye image.

Optional combinations of the aforementioned constituting elements, and implementations of the embodiment in the form of methods, apparatuses, systems, recording mediums, and computer programs may also be practiced as additional modes of the embodiment.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

Embodiment 1

A summary will be given before describing the invention in specific details. Embodiment 1 relates to a vehicle display device that subjects images captured by a plurality of imaging units provided in a vehicle to viewpoint transformation to produce a bird's-eye image and displays the bird's-eye images thus produced. When a vehicle is driven backward to park at a parking lot in a parking area where a plurality of vehicles are parked in arrays, the parking frame border drawn immediately beneath the other vehicle behind should be invisible from above, hidden from view beneath the other vehicle. The parking frame border should be invisible from above, hidden by the other vehicle. However, the parking frame border may not be hidden by the other vehicle from view and located closer to the driver's vehicle in a bird's-eye view produced by viewpoint transformation. This may cause the other vehicle behind to look located away from the parking frame border to the driver so that the driver cannot know the distance to the other vehicle behind properly.

In order to address this, the vehicle display device according to the embodiment detects an object such as the other vehicle in images around the driver's vehicle captured by a plurality of imaging units provided in the driver's vehicle and acquires a distance to the detected object. The vehicle display device also deletes a parking frame border located beneath the other vehicle object from the image if the distance is smaller than a threshold value. Further, the vehicle display device produces a bird's-eye view by subjecting the image in which the parking frame border is deleted to viewpoint transformation and displays the produced bird's-eye image.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the specification and drawings that have substantially identical functions and structures are represented by the same reference symbols so that the description is not duplicated. Elements not relevant to the invention directly are omitted from the illustration.

Figure 1:
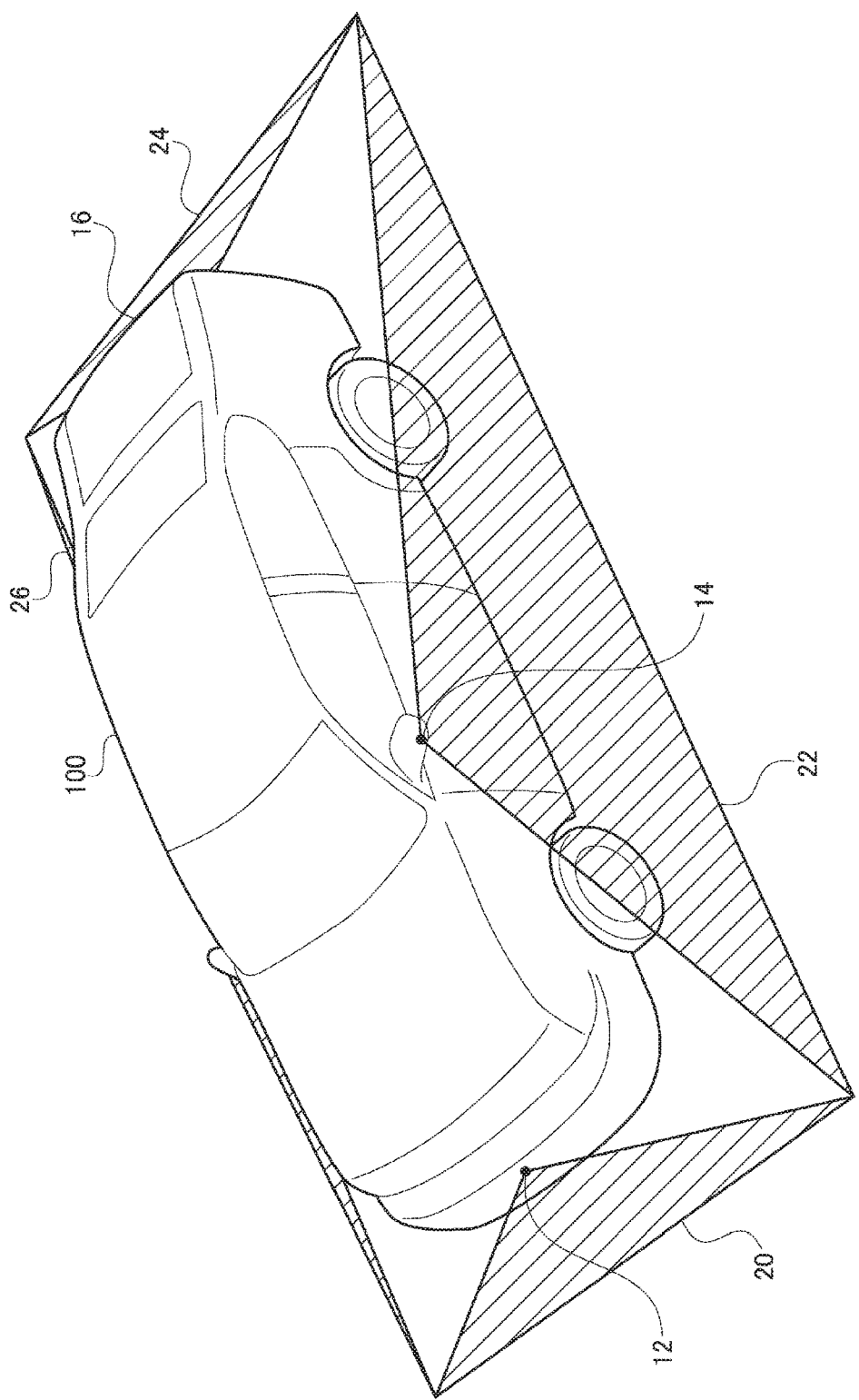
FIG. 1 is a perspective view showing an imaging range formed around a vehicle according to Embodiment 1.

FIG. 1 is a perspective view showing an imaging range formed around a vehicle 100 according to Embodiment 1. A front imaging unit 12 is provided in the frontal portion (e.g., a bumper, bonnet, etc.) of the vehicle 100. The front imaging unit 12 forms a front imaging area 20 extending forward from the front imaging unit 12 and captures an image in the front imaging area 20. A left imaging unit 14 is provided in the left portion (e.g., below a left door mirror, etc.) of the vehicle. The left imaging unit 14 forms a left imaging area 22 extending leftward from the left imaging unit 14 and captures an image in the left imaging area 22.

A rear imaging unit 16 is provided in the rear portion (e.g., a bumper, trunk, etc.) of the vehicle. The rear imaging unit 16 forms a rear imaging area 24 extending rearward from the rear imaging unit 16 and captures an image in the rear imaging area 24. A right imaging unit 18 (not shown) is provided in the right portion of the vehicle so as to be symmetrical with the left imaging unit 14. The right imaging unit 18 forms a right imaging area 26 extending rightward from the right imaging unit 18 and captures an image in the right imaging area 26. The front imaging unit 12, the left imaging unit 14, the rear imaging unit 16, and the right imaging unit 18 form an imaging unit 10. The imaging unit 10 captures images around the vehicle 100.

Figure 2A:
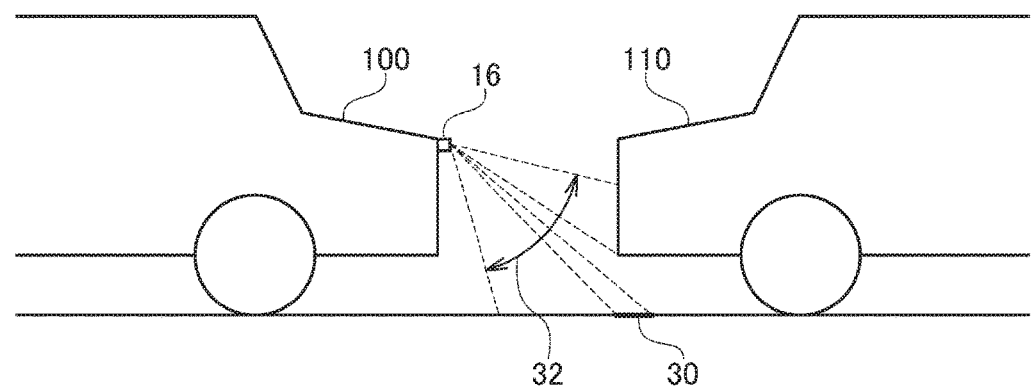
FIGS. 2A-2B show a summary of a process in a comparative example for Embodiment 1.
Figure 2B:
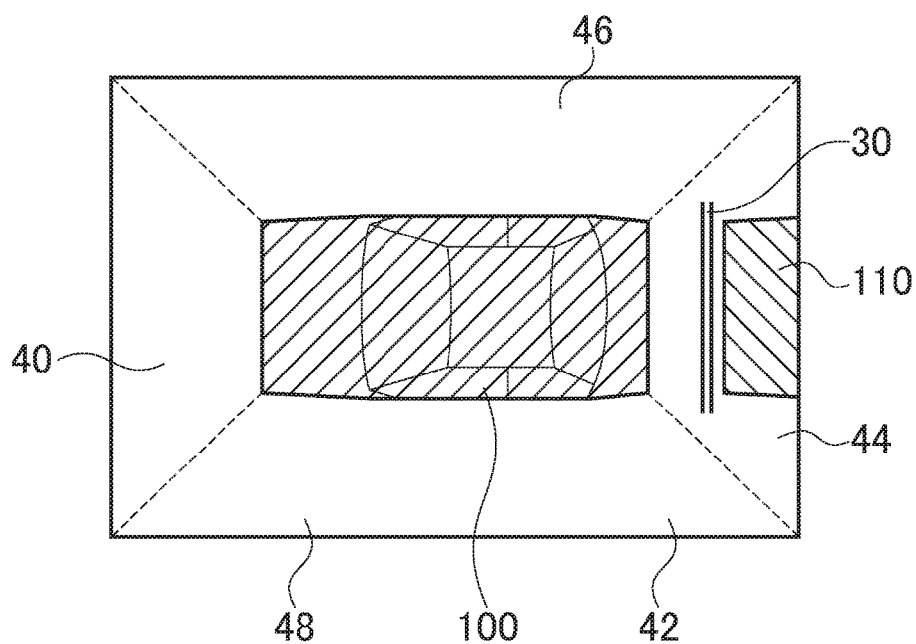

FIGS. 2A-2B show a summary of a process in a comparative example for Embodiment 1. In the comparative example, it is assumed that images are captured by the imaging unit 10 provided in the vehicle 100 as shown in FIG. 1. The process according to the comparative example for producing a bird's-eye view by subjecting the images to viewpoint transformation represents the related-art process. FIG. 2A shows a case where the vehicle 100 of FIG. 1 is viewed from left. As described above, the rear imaging unit 16 is provided in the rear portion of the vehicle 100. Further, another vehicle 110 is parked or stopped behind the vehicle 100. Still further, a frame border 30 is drawn on the ground and the frame border 30 is located beneath the front end of the other vehicle 110. Therefore, the frame border 30 is hidden by the other vehicle 110 when the vehicle 100 and the other vehicle 110 are viewed from above. Meanwhile, the rear imaging unit 16 has an imaging range 32 so that the image captured by the rear imaging unit 16 includes the front end of the other vehicle 110 and the frame border 30.

FIG. 2B shows a bird's-eye view 48 produced by subjecting the image captured by the imaging unit 10 to viewpoint transformation. As described above, the related-art processes are performed to produce the bird's-eye image 48. The vehicle 100 is located at the center of the bird's-eye image 48. A front image 40 is located in front of the vehicle 100, a left image 42 is located to the left of the vehicle 100, a rear image 44 is located behind the vehicle 100, and a right image 46 is located to the right of the vehicle 100. In particular, the rear image 44 is produced based on an image capturing the imaging range 32 in FIG. 2A. For this reason, the rear image 44 shows the other vehicle 110 behind the vehicle 100 and the frame border 30 is located between the vehicle 100 and the other vehicle 110. In other words, the frame border 30 that should be hidden by the other vehicle 110 from view is not hidden by the other vehicle 110 so that the bird's-eye image 48 differs from the actual scene.

Figure 3:
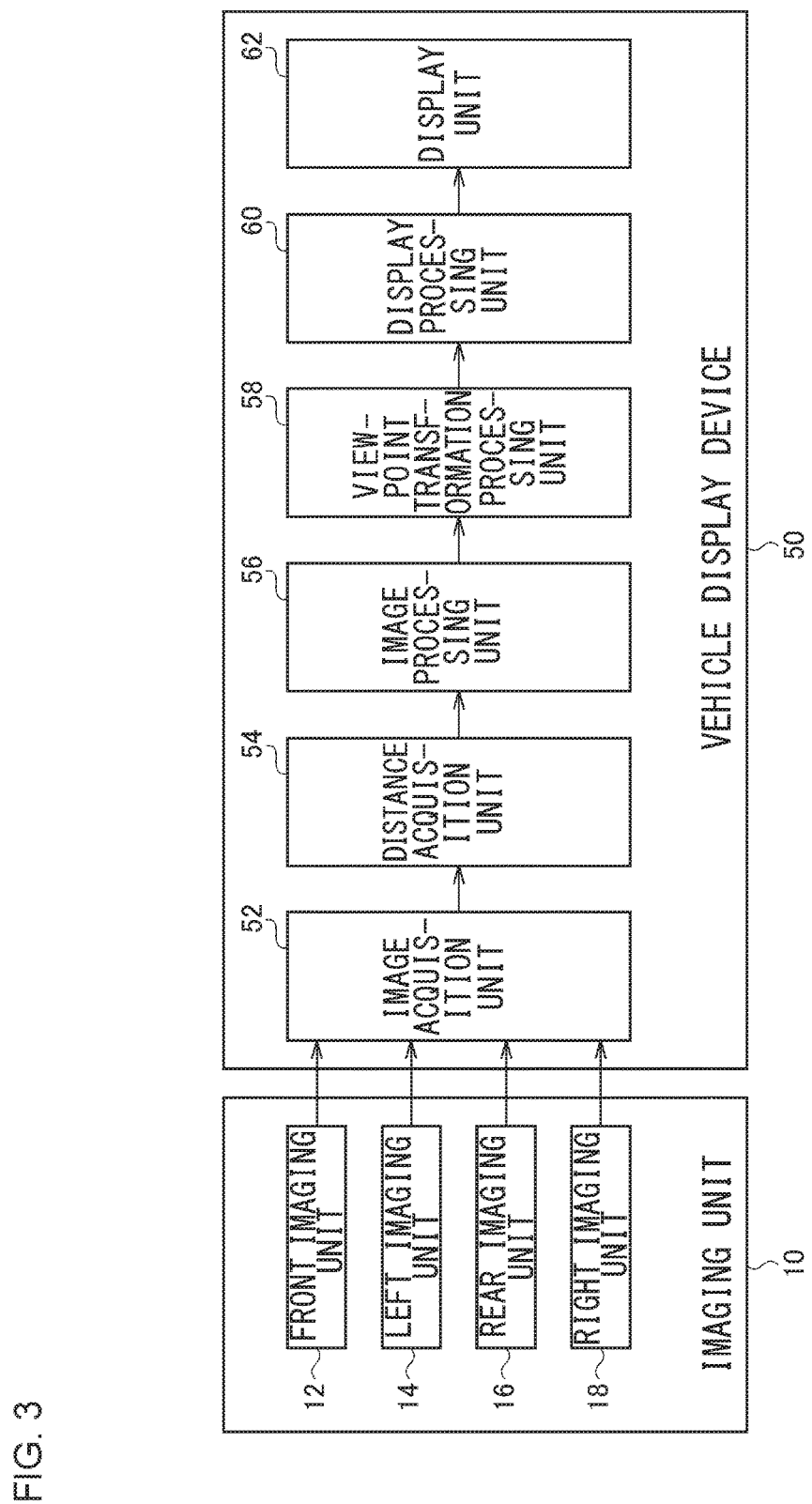
FIG. 3 shows features of a vehicle display device according to Embodiment 1.

FIG. 3 shows features of a vehicle display device 50 according to Embodiment 1. The vehicle display device 50 is connected to the front imaging unit 12, the left imaging unit 14, the rear imaging unit 16, and the right imaging unit 18 forming the imaging unit 10. The vehicle display device 50 includes an image acquisition unit 52, a distance acquisition unit 54, an image processing unit 56, a viewpoint transformation processing unit 58, a display processing unit 60, and a display unit 62.

As described above, the front imaging unit 12, the left imaging unit 14, the rear imaging unit 16, and the right imaging unit 18 capture images. The images are moving images but may be still images. The front imaging unit 12, the left imaging unit 14, the rear imaging unit 16, and the right imaging unit 18 output the images to the image acquisition unit 52.

Figure 4:
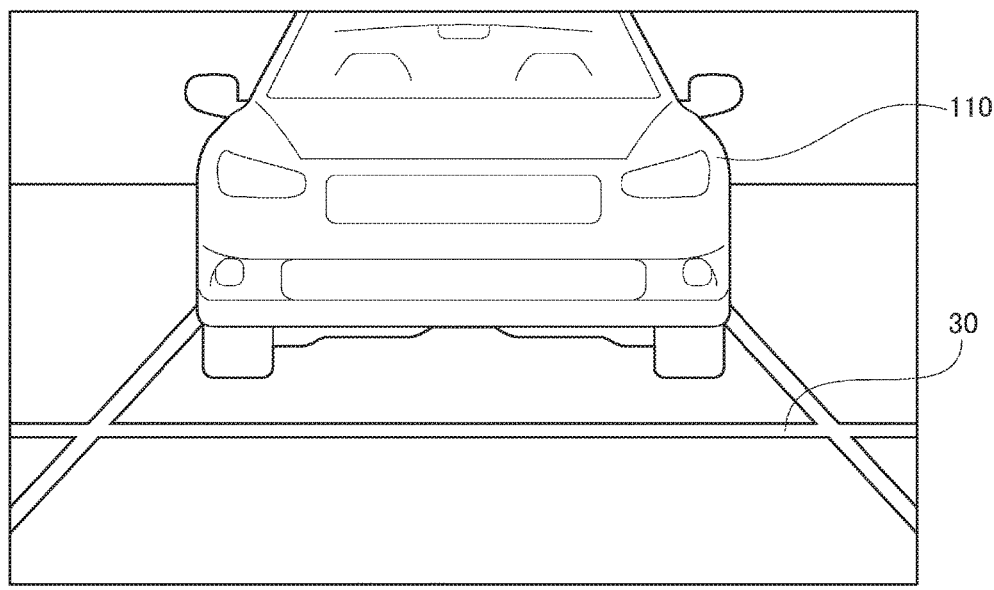
FIG. 4 shows an example of an image captured by the rear imaging unit of FIG. 3.

The image acquisition unit 52 receives the images from the front imaging unit 12, the left imaging unit 14, the rear imaging unit 16, and the right imaging unit 18. In other words, the image acquisition unit 52 acquires the images around the vehicle 100. FIG. 4 shows an example of an image captured by the rear imaging unit 16. In order to make the explanation easy to understand, the exemplary image shown in FIG. 4 does not show distortion in the image caused by the capability of the cameras of the imaging unit 10 to shoot a wide angle. It is assumed here that the other vehicle 110 is parked behind the vehicle 100 and the frame border 30 is drawn on the ground beneath the other vehicle 110, as shown in FIG. 2A. The image includes the other vehicle 110 and the frame border 30. Reference is made back to FIG. 3. The image acquisition unit 52 outputs the acquired images to the distance acquisition unit 54.

The distance acquisition unit 54 receives the images from the image acquisition unit 52. In order to make the explanation easy to understand, the process on the image captured by the rear imaging unit 16 will be explained. The other images may be processed similarly. The distance acquisition unit 54 performs an edge detection process in the image. An edge detection process is a type of feature detection or feature extraction and is an algorithm for identifying a portion where the brightness of the image varies discontinuously. Therefore, an object included in the image (e.g., the other vehicle 110) is detected. The distance acquisition unit 54 also detects a pattern included in the image (e.g., the frame border 30) by an edge detection process. An edge detection process is a publicly known technology and a detailed description is omitted. The frame border 30 referred to here is generally a white line drawn on the road surface and a publicly known white line detection technology based on a captured image is applicable. The same is true of a case where a curbstone is captured instead of the frame border 30.

The distance acquisition unit 54 acquires a distance to the detected object. The object for which the distance is acquired in the distance acquisition unit 54 is, for example, the other vehicle 110. For measurement of the distance, a publicly known technology may be used. For example, stereo distance measurement or a twin-lens camera may be used. A parallax created between a plurality of optical systems is calculated and the distance to the object is measured by referring to the parallax. In this case, the rear imaging unit 16 is provided with a plurality of optical systems. A distance sensor may be used to measure the distance to the object. The distance sensor (not shown) is provided in the neighborhood of the rear imaging unit 16. The distance sensor irradiates the object with infrared light or laser light, receives the reflected light, and calculates the distance by referring to information on the imaging position. A millimeter sensor may be used as the distance sensor.

Figure 5A:
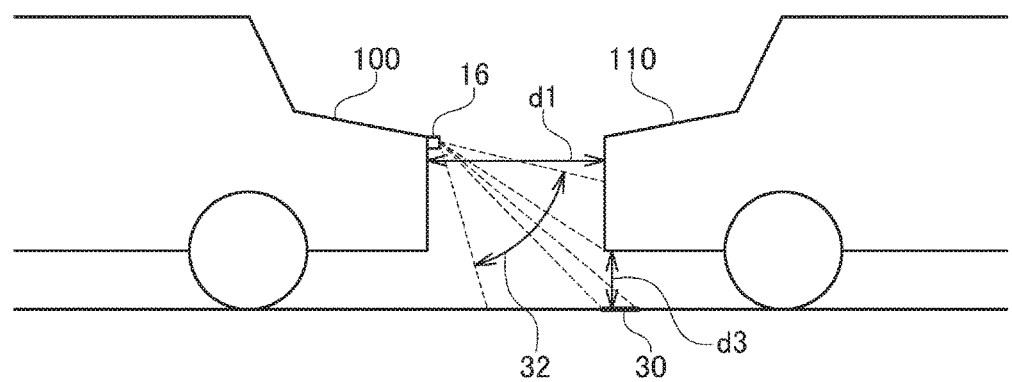
FIGS. 5A-5B show an outline of the process in the vehicle display device of FIG. 3.
Figure 5B:
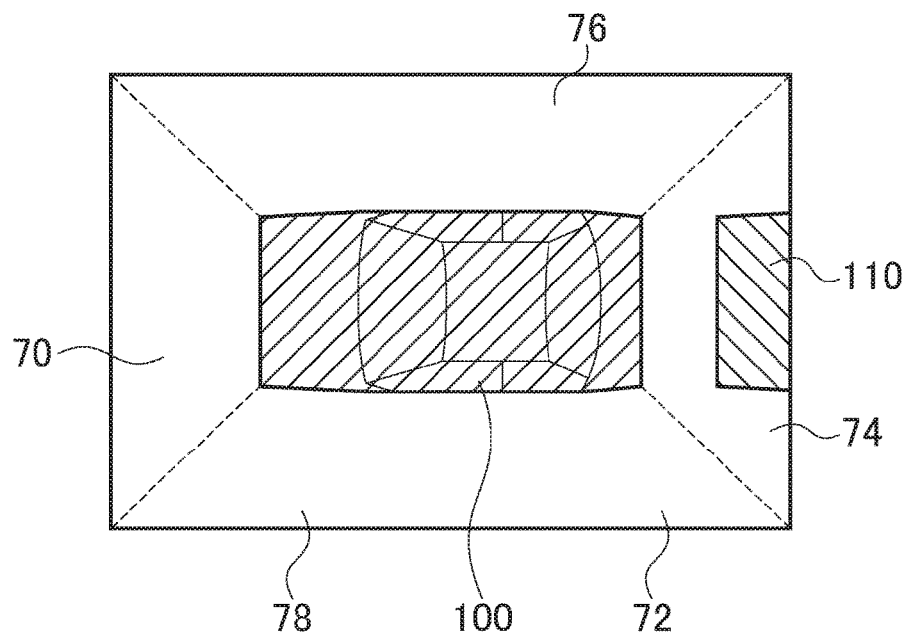

A vector detection process may be used to measure the distance to the object. In a vector detection process, the distance to the object is measured by detecting a unique point in an image and calculating an amount of vector transfer of the unique point. FIGS. 5A-5B show an outline of the process in the vehicle display device 50. FIG. 5A is similar to FIG. 2A. The distance acquisition unit 54 measures a distance "d1". FIG. 5B will be explained later and reference is made back to FIG. 3. The distance acquisition unit 54 outputs the acquired distance and the image to the image processing unit 56. The distance acquisition unit 54 also outputs information on the detected object and the pattern to the image processing unit 56.

The image processing unit 56 receives the distance and the image from the distance acquisition unit 54. The image processing unit 56 also receives the information on the object and the pattern from the distance acquisition unit 54. The image processing unit 56 determines whether the pattern is located beneath the object by referring to the information on the object and the pattern. In the case of FIG. 4, the frame border 30, which is the pattern, is located beneath the other vehicle 110, which is the object. In essence, the image processing unit 56 determines that the pattern is located beneath the object if the pattern is located beneath the object in the image. If the pattern is located beneath the object, the image processing unit 56 performs the following process.

The image processing unit 56 stores a predefined threshold value and compares the input distance with the threshold value. If the distance is smaller than the threshold value, the image processing unit 56 deletes a pattern included in the image and located beneath the object from the image. In the case of FIG. 4, the image processing unit 56 deletes the frame border 30 drawn on the ground from the image. If the distance d1 shown in FIG. 5A is smaller than the threshold value, the image processing unit 56 deletes the frame border 30. In essence, image processing unit 56 deletes the pattern from the image depending on the acquired distance. The image processing unit 56 outputs the image to a viewpoint transformation processing unit 58.

The viewpoint transformation processing unit 58 receives the image from the image processing unit 56. The viewpoint transformation processing unit 58 subjects the image to viewpoint transformation to produce an image as viewed from above the vehicle 100. For transformation, a publicly known technology may be used. For example, the pixels in the image may be projected onto a 3D curved surface in a virtual 3D space and a necessary region in the 3D curved surface is cut out in accordance with a virtual viewpoint above the vehicle 100. The cut-out region represents the image subjected to viewpoint transformation. An example of the image subjected to viewpoint transformation is shown in FIG. 5B. The vehicle 100 is located at the center of a bird's-eye image 78 in FIG. 5B. A front image 70 is located in front of the vehicle 100, a left image 72 is located to the left of the vehicle 100, a rear image 74 is located behind the vehicle 100, and a right image 76 is located to the right of the vehicle 100. It should particularly be noted that the rear image 74 does not include the frame border 30 which has already been deleted.

Figure 6A:
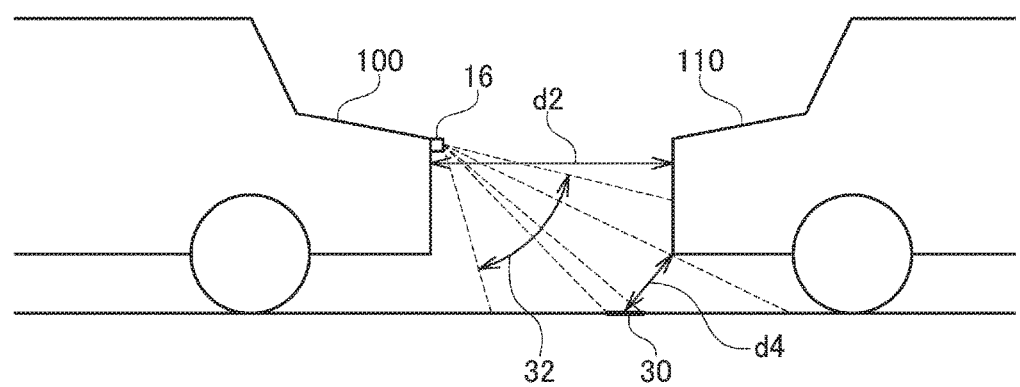
FIGS. 6A-6B show an outline of another process in the vehicle display device of FIG. 3.
Figure 6B:
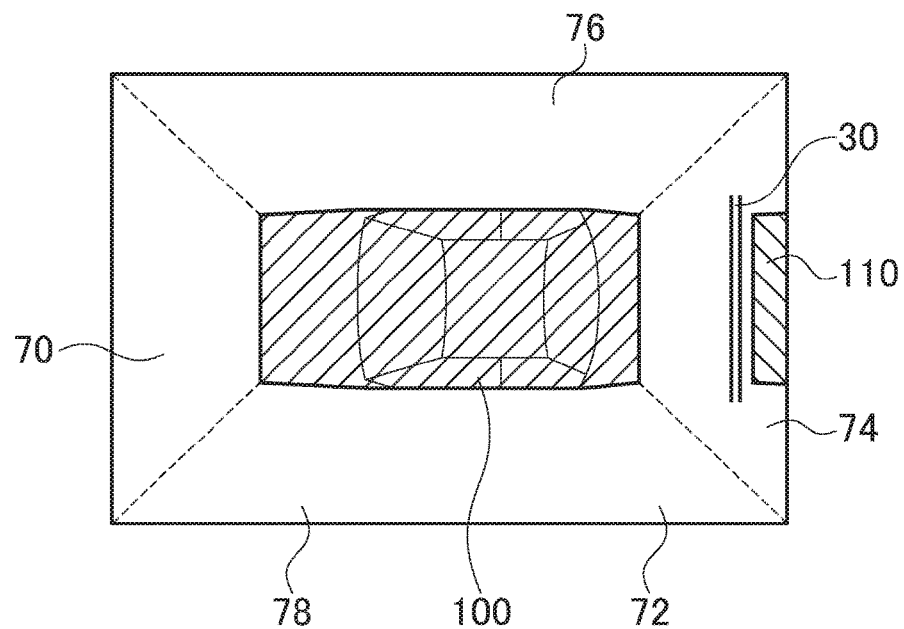

FIGS. 6A-6B show an outline of another process in the vehicle display device 50. FIG. 6A and FIG. 5A are similar but are different in the distance between the vehicle 100 and the other vehicle 110. The frame border 30 is not located beneath the front end of the other vehicle 110. Referring to FIG. 6A, the vehicle 100 and the other vehicle 110 are spaced apart by a distance d2. The distance d2 is longer than the distance d1 and is equal to or greater than the threshold value in the image processing unit 56. Therefore, the frame border 30 is not deleted in the image processing unit 56. The bird's-eye image 78 in FIG. 6B is similar to that of FIG. 5B except that the rear image 74 includes the frame border 30 between the vehicle 100 and the other vehicle 110. Reference is made back to FIG. 3. The viewpoint transformation processing unit 58 outputs the bird's-eye image 78 subjected to transformation to the display processing unit 60.

The display processing unit 60 receives the bird's-eye image 78 from the viewpoint transformation processing unit 58. The display processing unit 60 causes the display unit 62 to display the bird's-eye image 78. The display unit 62 displays the bird's-eye image 78 as shown in FIG. 5B and FIG. 6B.

The image processing unit 56 may perform a process different from the aforementioned process to determine whether the pattern is located beneath the object. The image processing unit 56 identifies the number of pixels between the object and the pattern by referring to the information on the object and the pattern. Further, the image processing unit 56 identifies the angular field of the image by referring to the received distance. Further, the image processing unit 56 stores, for each angular field, the relationship between the number of pixels and the actual distance and derives the distance between the object and the pattern by referring to the number of pixels and the angular field identified. The derived distance is indicated as a distance d3 in FIG. 5A and as a distance d4 in FIG. 6A.

The image processing unit 56 stores a threshold value different from the aforementioned threshold value and compares the derived distance with the threshold value. If the distance is smaller than the threshold value, the image processing unit 56 deletes a pattern included in the image and located beneath the object from the image. The distance d3 in FIG. 5A is smaller than the threshold value and the distance d4 in FIG. 6A is equal to or greater than the threshold value. Therefore, the image processing unit 56 deletes the frame border 30 in FIG. 5A and does not delete the frame border 30 in FIG. 6A, similarly as described above. The subsequent steps are as already described above.

Two types of processes in the image processing unit 56 have been described. In either case, the threshold value is a fixed value. Alternatively, the threshold value may be defined in accordance with the position that the rear imaging unit 16, etc. is attached. In other words, the image processing unit 56 may define the threshold value in accordance with the height of the rear imaging unit 16, etc. from the ground. The greater the height of the rear imaging unit 16, etc., the closer the image captured in the rear imaging unit 16, etc. and the image as viewed from above the vehicle 100 are. In this case, a situation in which the frame border 30 is shown between the vehicle 100 and the other vehicle 110 subsequent to viewpoint transformation despite the fact that frame border 30 is actually located beneath the other vehicle 110 is unlikely to occur. For this reason, the threshold value should be adjusted so that the pattern such as the frame border 30 is less likely to be deleted. Under these considerations, the distance acquisition unit 54 defines the threshold value such that the greater the height of the rear imaging unit 16, etc., the smaller the threshold value. For example, the threshold value is defined externally when the rear imaging unit 16, etc. is attached to the vehicle 100.

The features are implemented in hardware such as a CPU, a memory, or other LSI's of an arbitrary computer, and in software such as a program loaded into a memory, etc. The figure depicts functional blocks implemented by the cooperation of these elements. Therefore, it will be obvious to those skilled in the art that the functional blocks may be implemented in a variety of manners by hardware only or by a combination of hardware and software.

Figure 7:
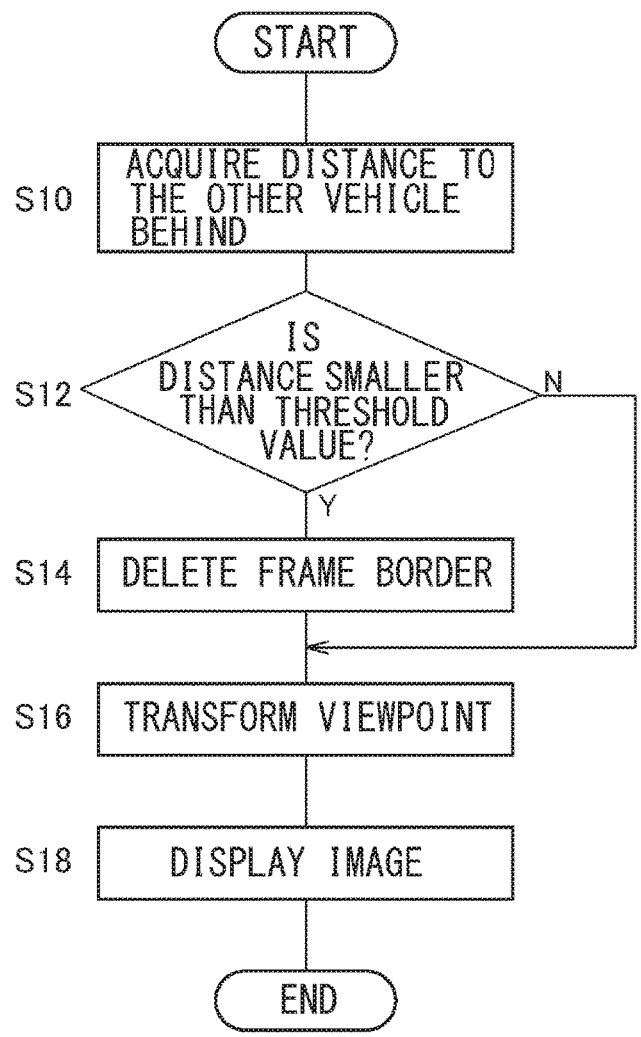
FIG. 7 is a flowchart showing steps for display performed by the vehicle display device of FIG. 3.

A description will be given of the operation of the vehicle display device 50 having the above described features. FIG. 7 is a flowchart showing steps for display performed by the vehicle display device 50. The distance acquisition unit 54 acquires the distance to the other vehicle 110 behind (S10). If the distance is smaller than the threshold value (Y in S12), the image processing unit 56 deletes the frame border 30 (S14). Meanwhile, if the distance is not smaller than the threshold value (N in S12), control is turned to step S16. The viewpoint transformation processing unit 58 transforms the viewpoint of the image (S16). The display processing unit 60 causes the display unit 62 to display the image (S18).

Figure 8:
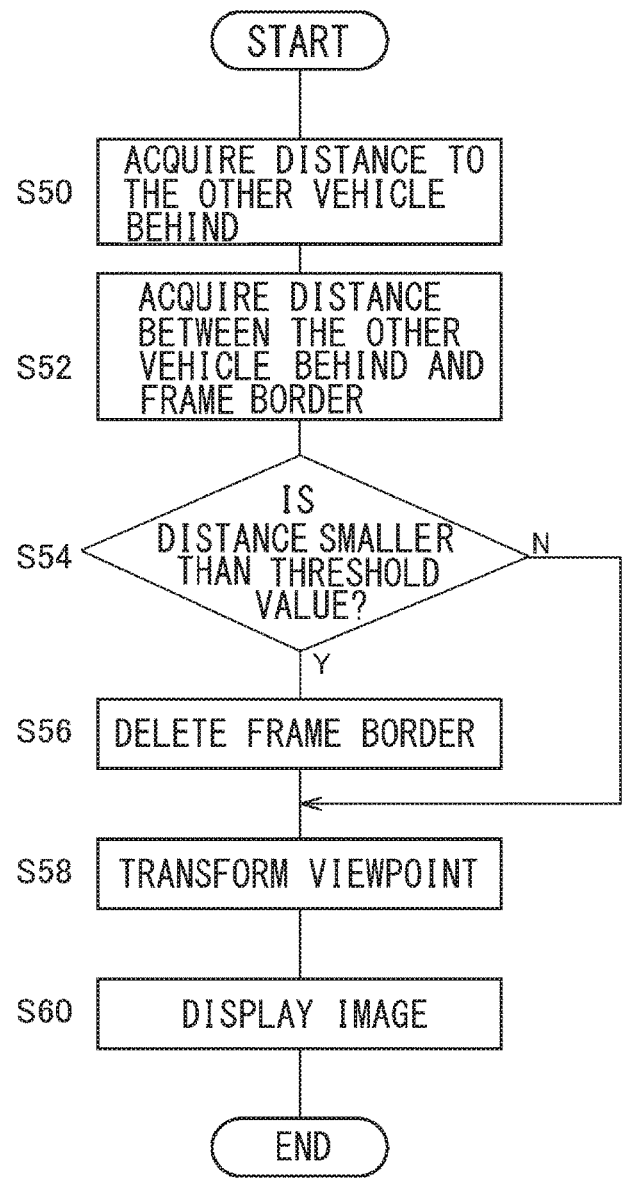
FIG. 8 is a flowchart showing alternative steps for display performed by the vehicle display device of FIG. 3.

FIG. 8 is a flowchart showing alternative steps for display performed by the vehicle display device 50. The distance acquisition unit 54 acquires the distance to the other vehicle 110 behind (S50). The image processing unit 56 derives the distance between the other vehicle 110 behind and the frame border 30 (S52). If the distance is smaller than the threshold value (Y in S54), the image processing unit 56 deletes the frame border 30 (S56). Meanwhile, if the distance is not smaller than the threshold value (N in S54), control is turned to step S58. The viewpoint transformation processing unit 58 transforms the viewpoint of the image (S58). The display processing unit 60 causes the display unit 62 to display the image (S60).

A description will be given of the process of deleting the frame border 30 in step S14 and step S56. For example, if the frame border 30 detected by the distance acquisition unit 54 is a white line indicating a lot in a parking area, the white line portion may be filled by a color of a tone similar to the color surrounding the white line, an area adjacent to the white line may be copied and pasted onto the white line, a line covering the white line may be drawn on the white line with a color such as black, etc. In this case, the frame border 30 perpendicular to or substantially perpendicular to each imaging direction of the imaging unit 10 is subject to deletion. Alternatively, the frame border 30 parallel to or substantially parallel to the side of the other vehicle 110 facing the imaging unit 10 capturing an image of the other vehicle 110 is subject to deletion. The frame border 30 shown in FIG. 2B meets both of these conditions.

According to this embodiment, a bird's-eye image is produced by deleting the frame border located beneath the other vehicle from the image, depending on the distance to the other vehicle so that the the frame border that should be hidden from view by the other vehicle in the bird's-eye image is prevented from being displayed. Since the frame border that should be hidden from view by the other vehicle in the bird's-eye image is prevented from being displayed, it is ensured that the bird's-eye image closely represents the actual scene. Further, since the actual scene is closely represented by the bird's-eye image, the distance to the object can be accurately reflected in viewpoint transformation. Since it is only required to compare the distance to the other vehicle with a threshold value, the process is simplified. Since the distance between the other vehicle and the frame border is compared with a threshold value, precision of the process is improved. The threshold value is defined in accordance with the height of the imaging unit from the ground, precision of the process is improved.

The embodiment is described above as being applied to the rear image 74 captured by the rear imaging unit 16, but can also be applied to the front image 70 captured by the front imaging unit 12, the left image 72 captured by the left imaging unit 14, and the right image 76 captured by the right imaging unit 18. Application of the embodiment to the rear image 74 captured by the rear imaging unit 16 is useful when the vehicle is driven backward to park at a parking area. Application of the embodiment to the front image 70 captured by the front imaging unit 12 is useful when the vehicle is driven forward to park in a parking area. Application of the embodiment to the left image 72 captured by the left imaging unit 14 or the right image 76 captured by the right imaging unit 18 is useful when the vehicle is driven sideways by going back and forth to park or when the vehicle passes by another vehicle in a narrow road.

Embodiment 2

A description will now be given of Embodiment 2. The vehicle display device according to Embodiment 2 detects an object such as another vehicle in images around the driver's vehicle captured by a plurality of imaging units provided in the driver's vehicle and acquires a distance to the detected object. The vehicle display device hides the parking frame border located beneath the other vehicle object from view by the driver's vehicle, if the distance is smaller than a threshold value. Further, the vehicle display device produces a bird's-eye view by subjecting the image in which the parking frame border is deleted to viewpoint transformation and displays the produced bird's-eye image.

FIGS. 1 and 2 are relevant to Embodiment 2, too. Referring to FIG. 2A, the rear imaging unit 16 diagonally captures an image of the other vehicle 110 and the frame border 30 from a position not above the vehicle 100 so that the image captured by the rear imaging unit 16 includes the front end of the other vehicle 110 and the frame border 30. Referring to FIG. 2B, the frame border 30 that should be hidden from view by the other vehicle 110 is not hidden by the other vehicle 110 so that the bird's-eye image 48 differs from the actual scene.

Figure 9:
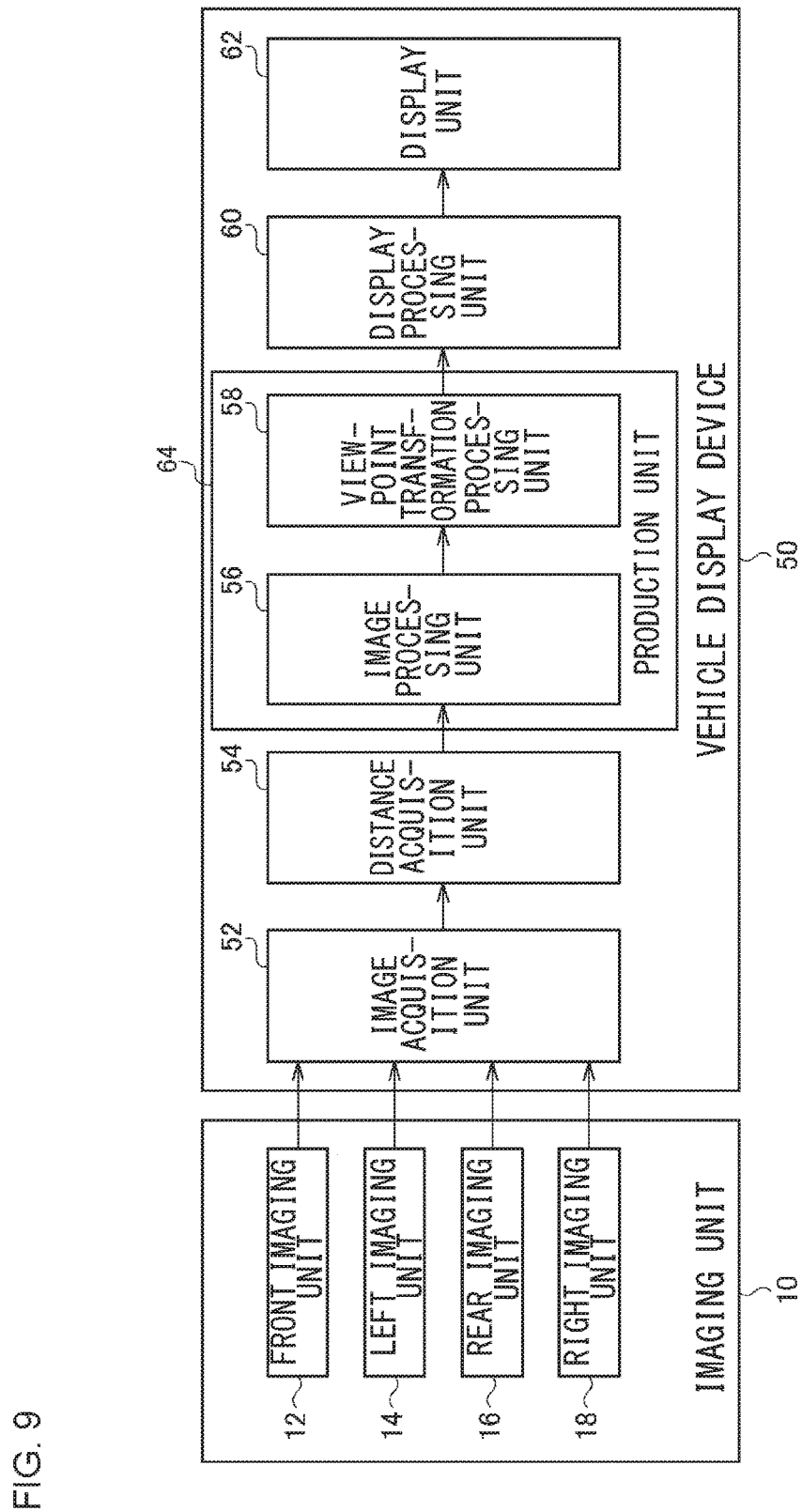
FIG. 9 shows features of a vehicle display device according to Embodiment 2.

FIG. 9 shows features of the vehicle display device 50 according to Embodiment 2. The vehicle display device 50 is connected to the front imaging unit 12, the left imaging unit 14, the rear imaging unit 16, and the right imaging unit 18 forming the imaging unit 10. The vehicle display device 50 includes an image acquisition unit 52, a distance acquisition unit 54, a production unit 64, a display processing unit 60, and a display unit 62. The production unit 64 includes an image processing unit 56 and a viewpoint transformation processing unit 58.

The front imaging unit 12, the left imaging unit 14, the rear imaging unit 16, the right imaging unit 18, and the image acquisition unit 52 are as shown in FIG. 3. The distance acquisition unit 54 acquires the distance between a first object and the vehicle 100. The object for which the distance is acquired in the distance acquisition unit 54 is, for example, the other vehicle 110. The distance acquisition unit 54 may continually acquire the distance to an object located in a direction of detecting the distance to the object. Alternatively, the distance acquisition unit 54 may operate when the first object is detected by the image processing unit 56 to acquire the distance to the first object. For measurement of the distance, a publicly known technology may be used. For example, stereo distance measurement or a twin-lens camera may be used. A parallax created between a plurality of optical systems is calculated and the distance to the object is measured by referring to the parallax. In this case, the rear imaging unit 16 is provided with a plurality of optical systems. A distance sensor may be used to measure the distance to the object. The distance sensor (not shown) is provided in the neighborhood of the rear imaging unit 16. The distance sensor irradiates the object with infrared light or laser light, receives the reflected light, and calculates the distance by referring to information on the imaging position. A millimeter sensor may be used as the distance sensor.

Figure 10A:
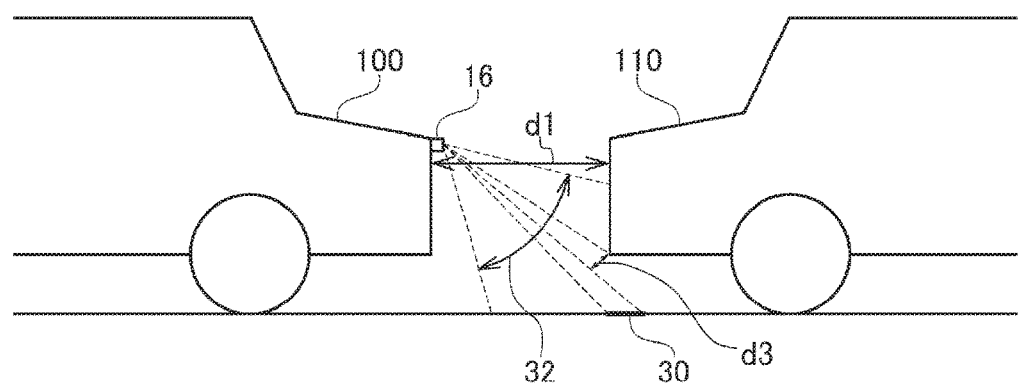
FIGS. 10A-10B show an outline of the process in the vehicle display device of FIG. 9.
Figure 10B:
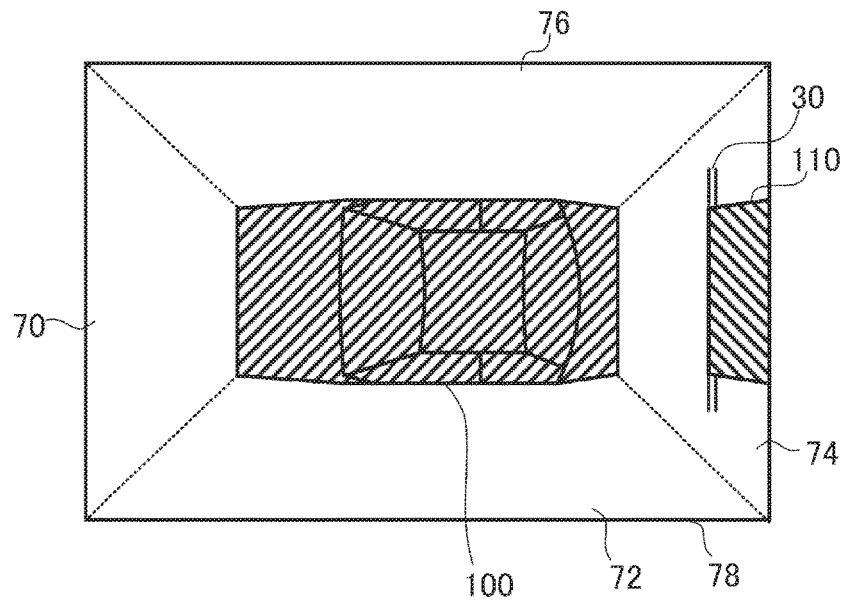

For measurement of the distance to the object, the distance acquisition unit 54 may apply a vector detection process using the image acquired from the image acquisition unit 52. In a vector detection process, the distance to the object is measured by detecting a unique point in an image and calculating an amount of vector transfer of the unique point. FIGS. 10A-10B show an outline of the process in the vehicle display device 50. FIG. 10A is similar to FIG. 2A. The distance acquisition unit 54 measures a distance "d1" as the first distance. FIG. 10B will be explained later and reference is made back to FIG. 9. The distance acquisition unit 54 outputs the acquired first distance to the image processing unit 56.

The image processing unit 56 receives the images from the image acquisition unit 52. For clarity of the explanation, the process on the image captured by the rear imaging unit 16 will be explained. The other images may be processed similarly. The image processing unit 56 performs an edge detection process in the image. An edge detection process is a type of feature detection or feature extraction and is an algorithm for identifying a portion where the brightness of the image varies discontinuously. The image processing unit 56 outputs the first object included in the image (e.g., the other vehicle 110). The image processing unit 56 also detects a second object included in the image (e.g., the frame border 30). An edge detection process is a publicly known technology and a detailed description is omitted. The frame border 30 referred to here is generally a white line drawn on the road surface and a publicly known white line detection technology based on a captured image is applicable. The same is true of a case where a curbstone is captured instead of the frame border 30.

The image processing unit 56 also acquires the relative positions of the first object and the second object detected. The image processing unit 56 determines whether the second object is located beneath the first object by referring to the information on the first object and the second object detected. In the case of FIG. 4, the frame border 30, which is the second object, is located beneath the other vehicle 110, which is the first object. In essence, the image processing unit 56 determines that the second object is located beneath the first object if the position of the second object is below the the first object in the image and if the second distance represented by the number of pixels between the first object and the second object is smaller than the second threshold value. For determination as to whether the second object is located beneath the first object, the image processing unit 56 may additionally require that the second object be arranged perpendicular to the imaging direction. In the case of FIG. 4, the portion of the frame border 30, i.e., the second object, extending transversely in the screen is subject to the requirement above. If the second object is located beneath the first object, the image processing unit 56 performs the following process.

Figure 11:
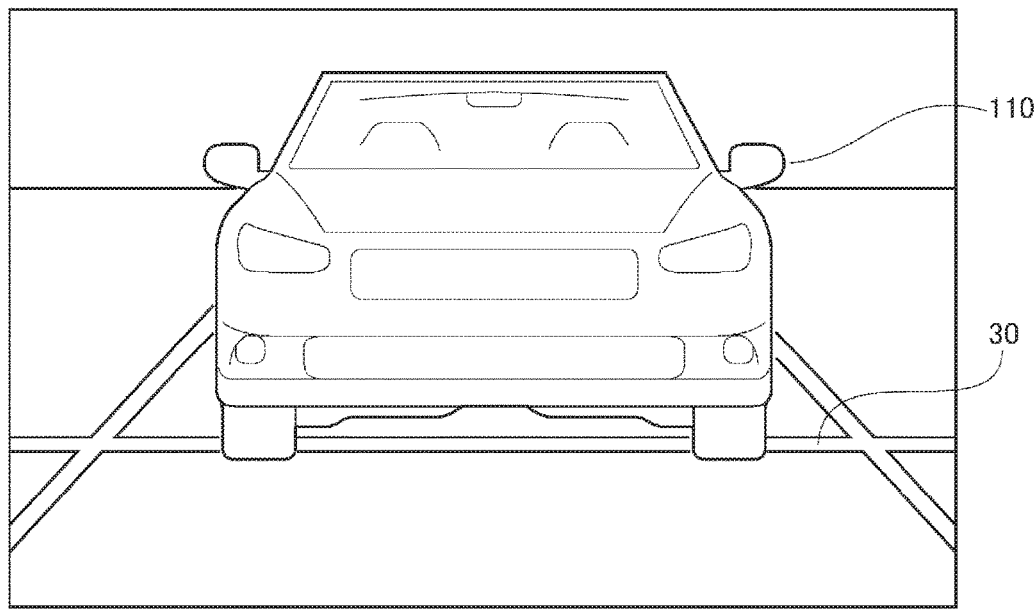
FIG. 11 shows an image processed in the image processing unit of FIG. 9.

The image processing unit 56 stores the predefined first threshold value for the distance between the vehicle 100 and the first object and compares the first distance acquired from the distance acquisition unit 54 with the first threshold value. For example, if the distance d1, the first distance, shown in FIG. 10A is smaller than the first threshold value, the image processing unit 56 hides the second object included in the image and located beneath the first object from view. To describe it more specifically, the image processing unit 56 cuts out the outer shape of the first object and then pastes and superimposes the outer shape on the second object. The result is shown in FIG. 11. FIG. 11 shows an image processed in the image processing unit 56. In this way, the other vehicle 110 is superimposed on the frame border 30 such that a portion of the frame border 30 is hidden from view. In this process, the image processing unit 56 pastes the outer shape of the other vehicle 110 in the image such that the other vehicle 110 is more toward the driver's vehicle 100 than the frame border 30. Reference is made back to FIG. 9. The image processing unit 56 outputs the image to a viewpoint transformation processing unit 58.

The viewpoint transformation processing unit 58 receives the image from the image processing unit 56. The viewpoint transformation processing unit 58 subjects the image to viewpoint transformation to produce an image as viewed from above the vehicle 100. For transformation, a publicly known technology may be used. For example, the pixels in the image may be projected onto a 3D curved surface in a virtual 3D space and a necessary region in the 3D curved surface is cut out in accordance with a virtual viewpoint above the vehicle 100. The cut-out region represents the image subjected to viewpoint transformation. An example of the image subjected to viewpoint transformation is shown in FIG. 10B. The vehicle 100 is located at the center of a bird's-eye image 78 in FIG. 10B. A front image 70 is located in front of the vehicle 100, a left image 72 is located to the left of the vehicle 100, a rear image 74 is located behind the vehicle 100, and a right image 76 is located to the right of the vehicle 100. It should particularly be noted that the other vehicle 110 is shown superimposed on the frame border 30 in the rear image 74, and a portion of the frame border 30 is hidden from view by the other vehicle 110.

FIGS. 6A-6B show an outline of another process in the vehicle display device 50. FIG. 6A and FIG. 10A are similar but are different in the distance between the vehicle 100 and the other vehicle 110. The frame border 30 is not located beneath the front end of the other vehicle 110. Referring to FIG. 6a, the vehicle 100 and the other vehicle 110 are spaced apart by a distance d2 as the first distance. The distance d2 is longer than the distance d1 and is equal to or greater than the first threshold value. Therefore, the other vehicle 110 is not moved and the frame border 30 is not hidden from view by the image processing unit 56. The bird's-eye image 78 in FIG. 6B is similar to that of FIG. 10B except that the rear image 74 includes the frame border 30 between the vehicle 100 and the other vehicle 110. Reference is made back to FIG. 9. The viewpoint transformation processing unit 58 outputs the bird's-eye image 78 subjected to transformation to the display processing unit 60.

The display processing unit 60 receives the bird's-eye image 78 from the viewpoint transformation processing unit 58. The display processing unit 60 causes the display unit 62 to display the bird's-eye image 78. The display unit 62 displays the bird's-eye image 78 as shown in FIG. 10B and FIG. 6B.

The process performed by the image processing unit 56 to identify the second distance for determination as to whether the second object is located beneath the first object will be described in specific details. The image processing unit 56 identifies the number of pixels between the first object and the second object by referring to the information on the first object and the second object. Further, the image processing unit 56 uses the angular field information of the image to derive the relationship, based on the first distance acquired by the distance acquisition unit 54, between the number of pixels and the actual distance. The image processing unit 56 derives the second distance between the first object and the second object, by referring to the number of pixels and the angular field identified between the first object and the second object. The derived second distance is indicated as a distance d3 in FIG. 10A and as a distance d4 in FIG. 6A.

The image processing unit 56 stores a second threshold value different from the aforementioned first threshold value and compares the derived second distance with the second threshold value. If the second distance is smaller than the second threshold value, the image processing unit 56 hides the second object such as a pattern included in the image and located beneath the first object from view. The distance d3 in FIG. 10A is smaller than the second threshold value and the distance d4 in FIG. 6A is equal to or greater than the second threshold value. Therefore, as described above, the image processing unit 56 superimposes the other vehicle 110 on the frame border 30 in FIG. 10A, and does not move the other vehicle 110 in FIG. 6A.

Figure 12:
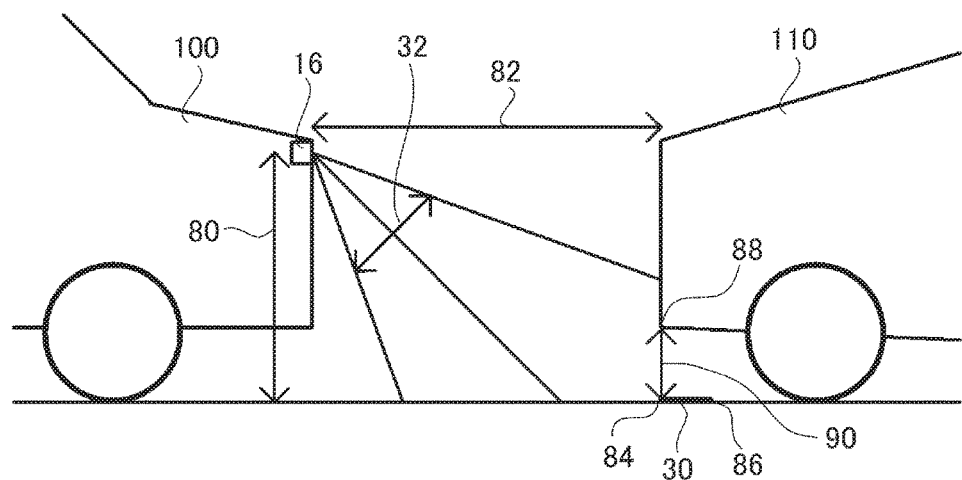
FIG. 12 shows an outline of the process in the vehicle display device of FIG. 9.

FIG. 12 shows an outline of the process in the vehicle display device 50. FIG. 12 is similar to FIGS. 10A and 6A. Referring to FIG. 12, an imaging unit height 80 is defined to be 500 mm, an inter-vehicle distance 82 is defined to be 700 mm, a ground height of a lower rear end of the other vehicle 90 is defined to be 150 mm, and a width of the frame border 30 is defined to be 100 mm, for example. Further, a frame border front end 84 is a portion of the frame border 30 closest to the vehicle 100, and a frame border far end 86 is a portion of the frame border 30 farthest from the vehicle 100. A lower rear end of the other vehicle 88 is the lower end of the other vehicle 110 toward the vehicle 100. Further, the rear imaging unit 16 is oriented at −45° in the height direction of the vehicle 100, and the imaging range 32, i.e., the angular field, is defined to be ±25°.

Figure 13A:
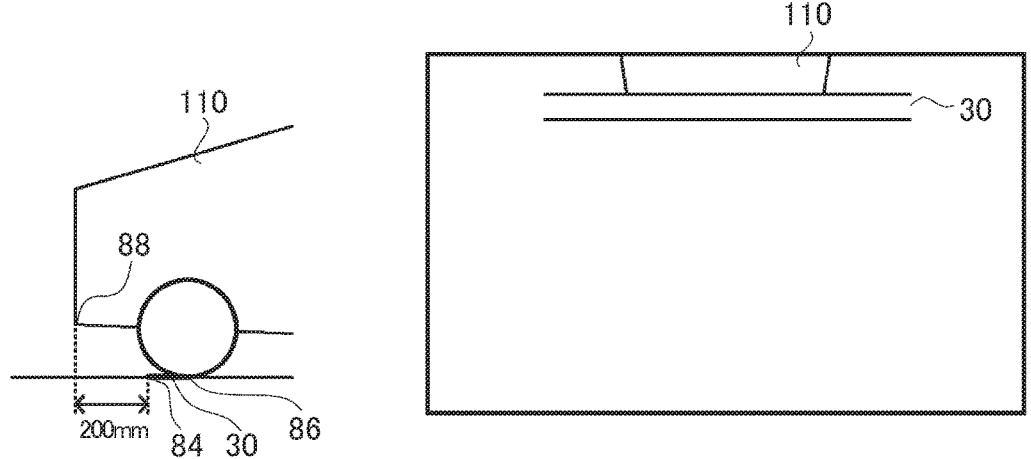
FIGS. 13A-13B show an outline of the process in the vehicle display device of FIG. 9.
Figure 13B:
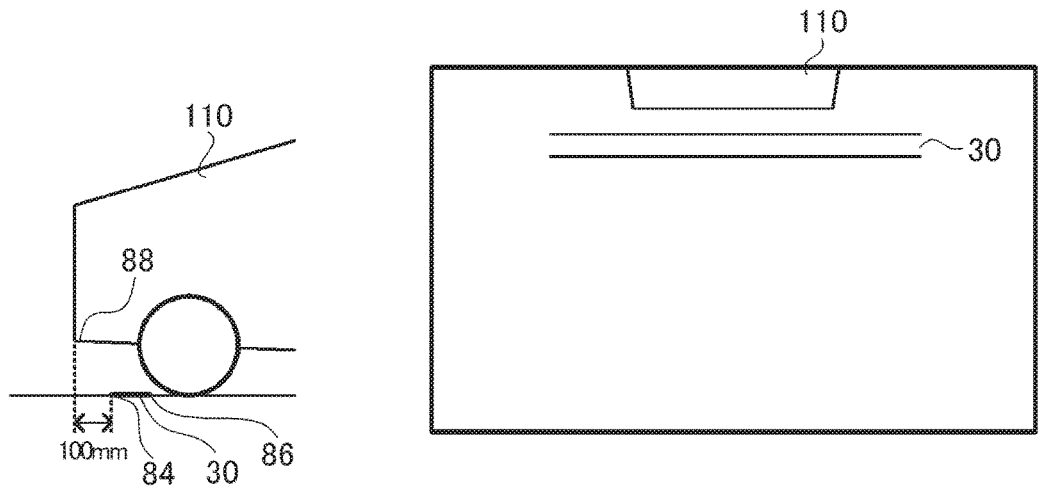

Given that the number of pixels in the vertical direction in the image captured by the rear imaging unit 16 is "1080", the number of pixels from the upper end of the image to the lower rear end of the other vehicle 88 will be "142". FIGS. 13A-13B show an outline of the process in the vehicle display device 50. The left of FIG. 13A shows a case where the frame border front end 84 of the frame border 30 is further away from the vehicle 100 (not shown) than the lower rear end of the other vehicle 88 by 200 mm. In this case, the number of pixels from the upper end of the image to the frame border far end 86 is "142" and the number of pixels from the upper end of the image to the frame border front end 84 is "196" so that the number of pixels between the lower rear end of the other vehicle 88 and the frame border far end 86 is "0". As shown on the right, the frame border 30 in the bird's-eye image in this case is not hidden from view by the other vehicle 110 so that it is necessary to move the other vehicle 110.

The left of FIG. 13B shows a case where the frame border front end 84 of the frame border 30 is further away from the vehicle 100 (not shown) than the lower rear end of the other vehicle 88 by 100 mm. In this case, the number of pixels from the upper end of the image to the frame border far end 86 is "196" and the number of pixels from the upper end of the image to the frame border front end 84 is "259" so that the number of pixels between the lower rear end of the other vehicle 88 and the frame border far end 86 is "54". As shown on the right, the frame border 30 in the bird's-eye image in this case is not hidden from view by the other vehicle 110 so that it is necessary to move the other vehicle 110.

Figure 14A:
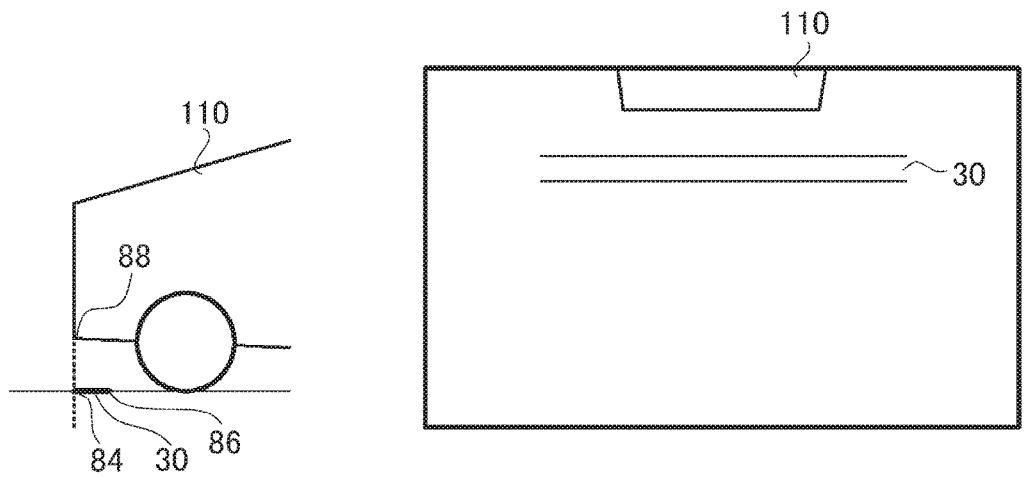
FIGS. 14A-14B show an outline of the process in the vehicle display device of FIG. 9.
Figure 14B:
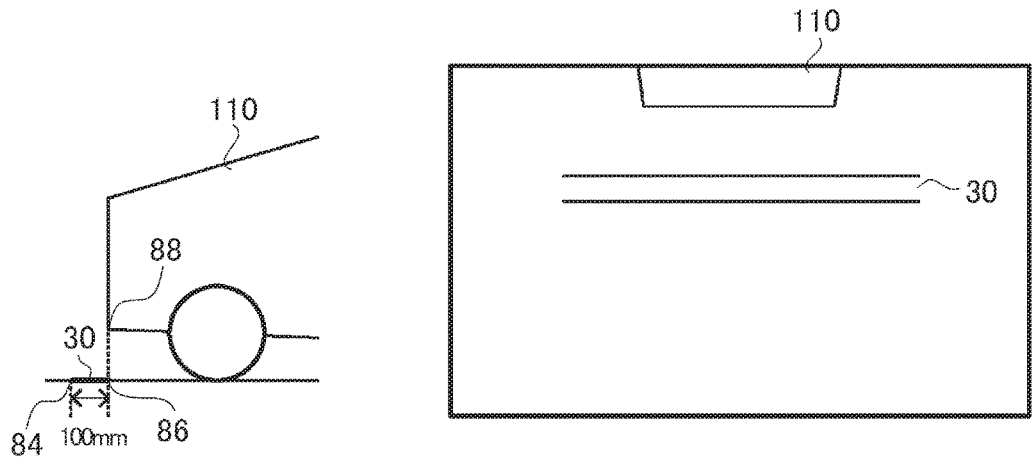

FIGS. 14A-14B show an outline of the process in the vehicle display device 50. The left of FIG. 14A shows a case where the frame border front end 84 of the frame border 30 is aligned with the lower rear end of the other vehicle 88. In this case, the number of pixels from the upper end of the image to the frame border far end 86 is "259" and the number of pixels from the upper end of the image to the frame border front end 84 is "336" so that the number of pixels between the lower rear end of the other vehicle 88 and the frame border far end 86 is "117". As shown on the right, the frame border 30 in the bird's-eye image in this case is not hidden from view by the other vehicle 110 so that it is necessary to move the other vehicle 110.

The left of FIG. 14B shows a case where the frame border front end 84 of the frame border 30 is closer to the vehicle 100 (not shown) than the lower rear end of the other vehicle 88 by 100 mm. In this case, the number of pixels from the upper end of the image to the frame border far end 86 is "336" and the number of pixels from the upper end of the image to the frame border front end 84 is "428" so that the number of pixels between the lower rear end of the other vehicle 88 and the frame border far end 86 is "194". As shown on the right, the frame border 30 in the bird's-eye image in this case is not hidden from view by the other vehicle 110 so that it is necessary to move the other vehicle 110. Summarizing FIGS. 13A-13B, FIGS. 14A-14B, the second threshold value in the image processing unit 56 is defined to be around "120".

Two types of processes in the image processing unit 56 have been described. In either case, the second threshold value is a fixed value. Alternatively, the second threshold value may be defined in accordance with the position that the rear imaging unit 16, etc. is attached. In other words, the image processing unit 56 may define the second threshold value in accordance with the height of the rear imaging unit 16, etc. from the ground. The greater the height of the rear imaging unit 16, etc., the closer the image captured in the rear imaging unit 16, etc. and the image as viewed from above the vehicle 100 are. In this case, a situation in which the frame border 30 is shown between the vehicle 100 and the other vehicle 110 subsequent to viewpoint transformation despite the fact that frame border 30 is actually located beneath the other vehicle 110 is unlikely to occur. For this reason, the second threshold value should be adjusted so that the pattern such as the frame border 30 is less likely to be deleted. Under these considerations, the distance acquisition unit 54 defines the second threshold value such that the greater the height of the rear imaging unit 16, etc., the smaller the threshold value. For example, the second threshold value is defined externally when the rear imaging unit 16, etc. is attached to the vehicle 100.

The features are implemented in hardware such as a CPU, a memory, or other LSI's of an arbitrary computer, and in software such as a program loaded into a memory, etc. The figure depicts functional blocks implemented by the cooperation of these elements. Therefore, it will be obvious to those skilled in the art that the functional blocks may be implemented in a variety of manners by hardware only or by a combination of hardware and software.

Figure 15:
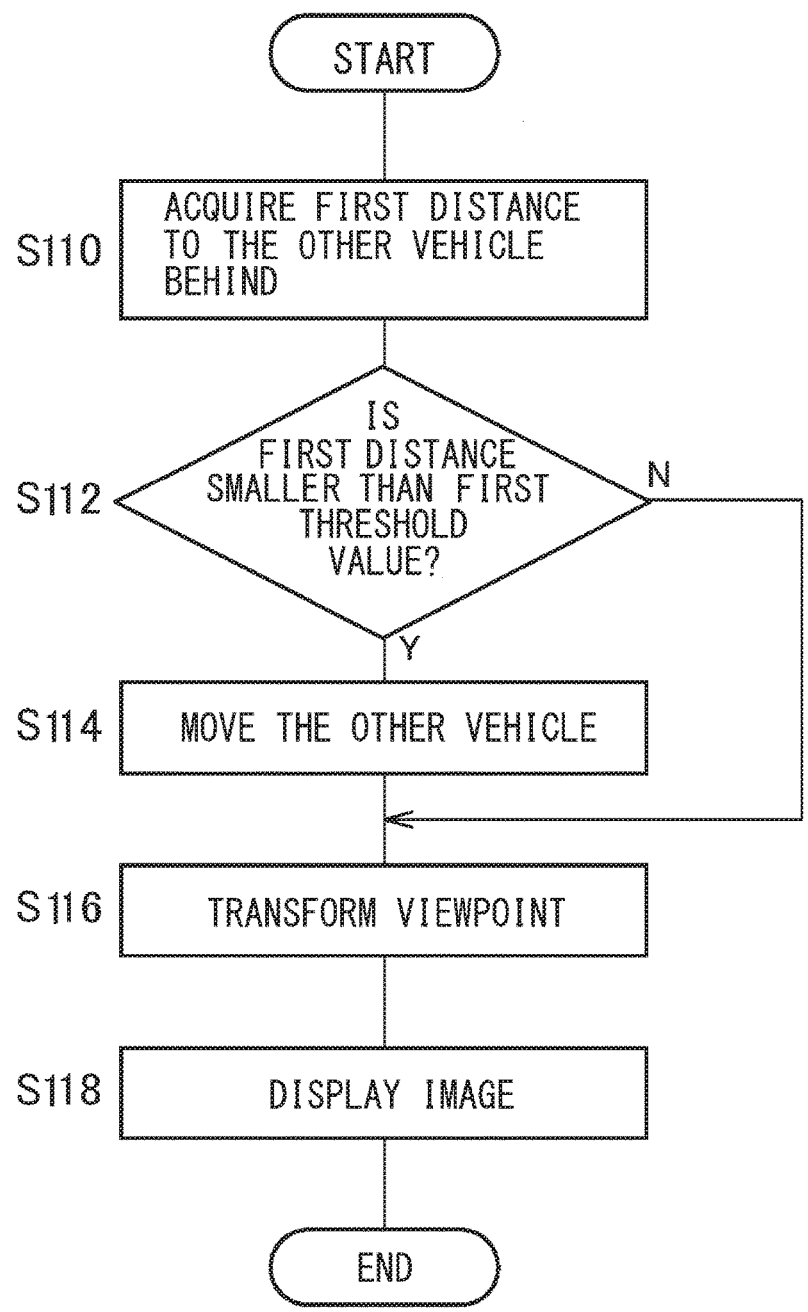
FIG. 15 is a flowchart showing steps for display performed by the vehicle display device of FIG. 9.

A description will be given of the operation of the vehicle display device 50 having the above described features. FIG. 15 is a flowchart showing steps for display performed by the vehicle display device 50. The distance acquisition unit 54 acquires the distance to the other vehicle 110 behind (first object) as the first distance (S110). If the first distance is smaller than the first threshold value (Y in S12), the image processing unit 56 moves the other vehicle 110 (S114). Meanwhile, if the first distance is not smaller than the first threshold value (N in S112), control is turned to step S116. The viewpoint transformation processing unit 58 transforms the viewpoint of the image (S116). The display processing unit 60 causes the display unit 62 to display the image (S118).

Figure 16:
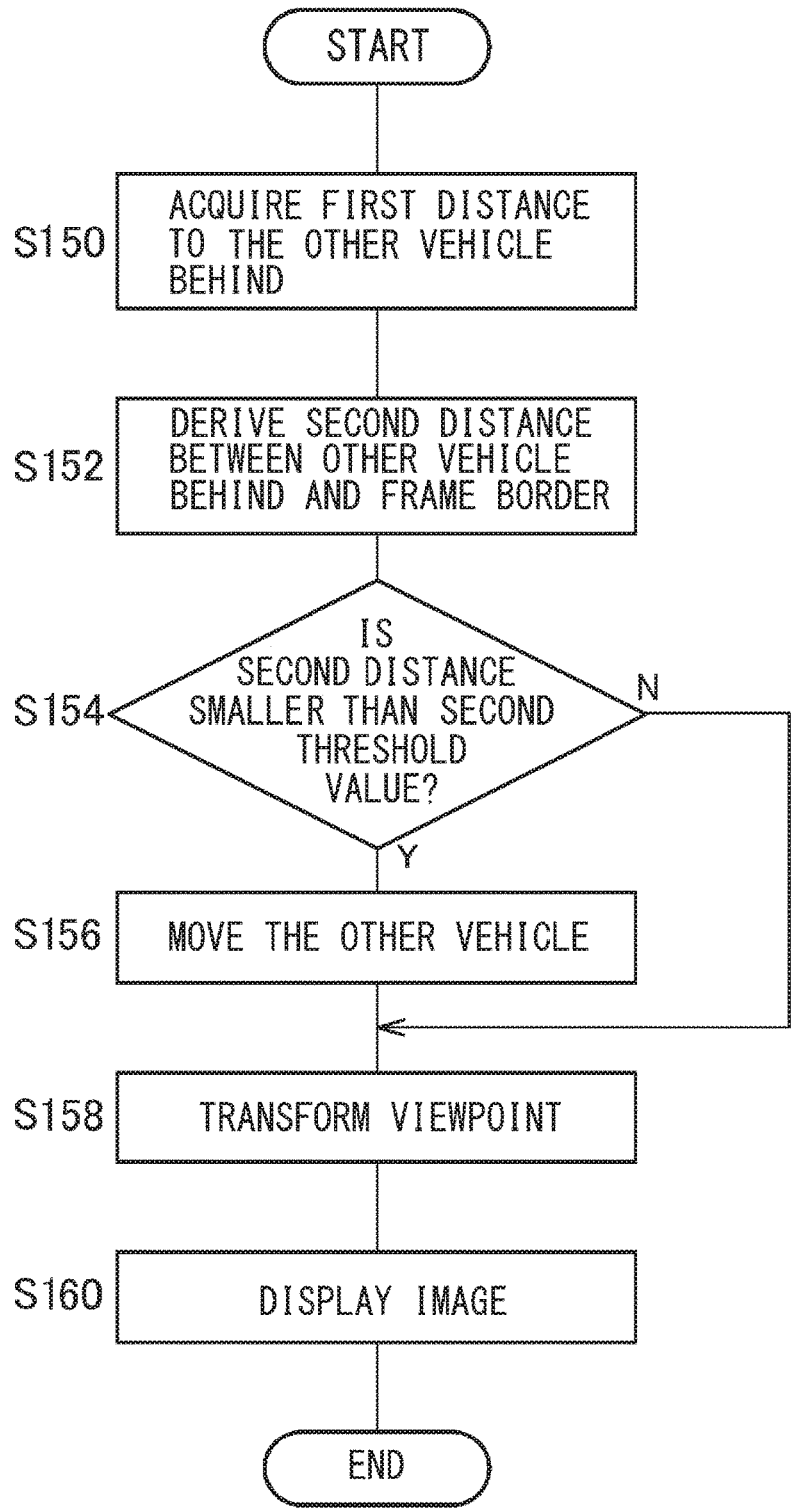
FIG. 16 is a flowchart showing alternative steps for display performed by the vehicle display device of FIG. 9.

FIG. 16 is a flowchart showing alternative steps for display performed by the vehicle display device 50. The distance acquisition unit 54 acquires the distance to the other vehicle 110 behind, i.e., the first object, as the first distance (S150). The image processing unit 56 derives the distance between the other vehicle 110 behind. i.e., the first object, and the frame border 30, i.e., the second object, as the second distance (S152). If the second distance is smaller than the second threshold value (Y in S154), the image processing unit 56 moves the other vehicle 110 (S156). Meanwhile, if the second distance is not smaller than the second threshold value (N in S154), control is turned to step S158. The viewpoint transformation processing unit 58 transforms the viewpoint of the image (S158). The display processing unit 60 causes the display unit 62 to display the image (S160).

According to this embodiment, a bird's-eye image is produced by hiding the frame border located beneath the other vehicle from view depending on the distance to the other vehicle so that the the frame border that should be hidden from view by the other vehicle from view in the bird's-eye image is prevented from being displayed. Since the frame border that should be hidden from view by the other vehicle in the bird's-eye image is prevented from being displayed, the bird's-eye image closely representing the actual scene is displayed. Further, the bird's-eye image close to the actual scene is displayed so that the distance to the object can be accurately known. Further, it is only required to compare the distance to the other vehicle with the threshold value so that the process is simplified. Further, the distance between the other vehicle and the frame border is compared with a threshold value so that precision of the process is improved. Further, the outer shape of the object is cut out, and pasted and superimposed on the pattern so that the process is simplified. Further, the outer shape of the object is pasted such that the outer shape is closer to the driver's vehicle than the pattern, the risk of collision is reduced.

Embodiment 3

A description will now be given of Embodiment 3. Like Embodiment 2, Embodiment 3 relates to a vehicle display device that subjects images captured by a plurality of imaging units provided in a vehicle to viewpoint transformation to produce a bird's-eye image and displays the bird's-eye images thus produced. The vehicle display device according to Embodiment 2 hides the parking frame border located beneath the other vehicle object from view by the driver's vehicle, if the distance is smaller than a threshold value before producing a bird's-eye view by performing viewpoint transformation. Meanwhile, according to Embodiment 3, a bird's-eye view is produced by performing viewpoint transformation and then the parking frame border located beneath the other vehicle object is hidden from view by the driver's vehicle, if the distance is smaller than a threshold value. In essence, the sequence of the process is reversed with reference to Embodiment 2. The difference from Embodiment 2 will mainly be described below.

Figure 17:
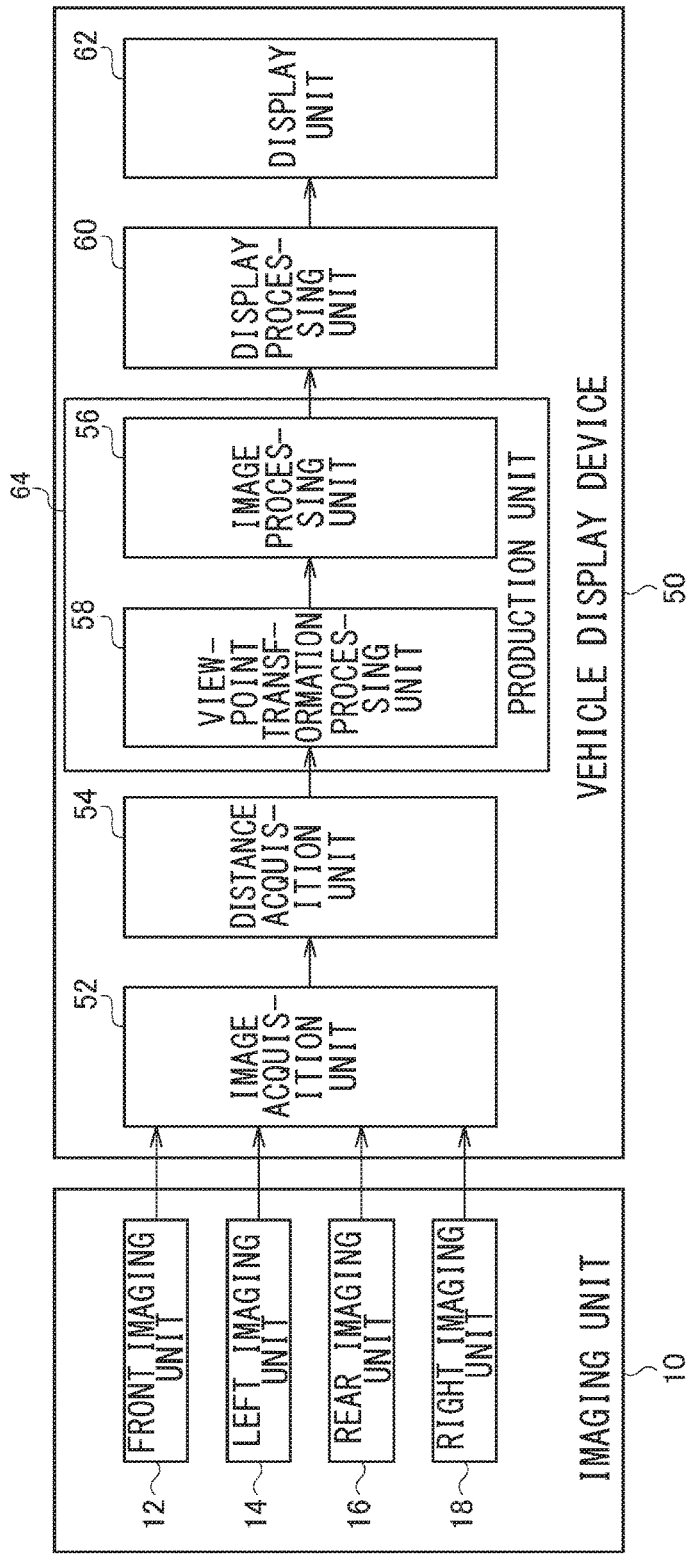
FIG. 17 shows features of a vehicle display device according to Embodiment 3.

FIG. 17 shows features of a vehicle display device 50 according to Embodiment 3. The vehicle display device 50 includes constituting elements similar to those of FIG. 9. Unlike the production unit 64 of FIG. 9, the production unit 64 of FIG. 17 is configured such that the viewpoint transformation processing unit 58 and the image processing unit 56 are arranged in the stated order.

The viewpoint transformation processing unit 58 subjects the image acquired in the image acquisition unit 52 to viewpoint transformation to produce an image as viewed from above the vehicle. The image processing unit 56 hides the pattern located beneath the object included in the bird's-eye image produced in the viewpoint transformation processing unit 58 from view depending on the distance acquired in the distance acquisition unit 54. To hide the pattern from view, the other vehicle 110 may be moved similarly as described above.

Figure 18:
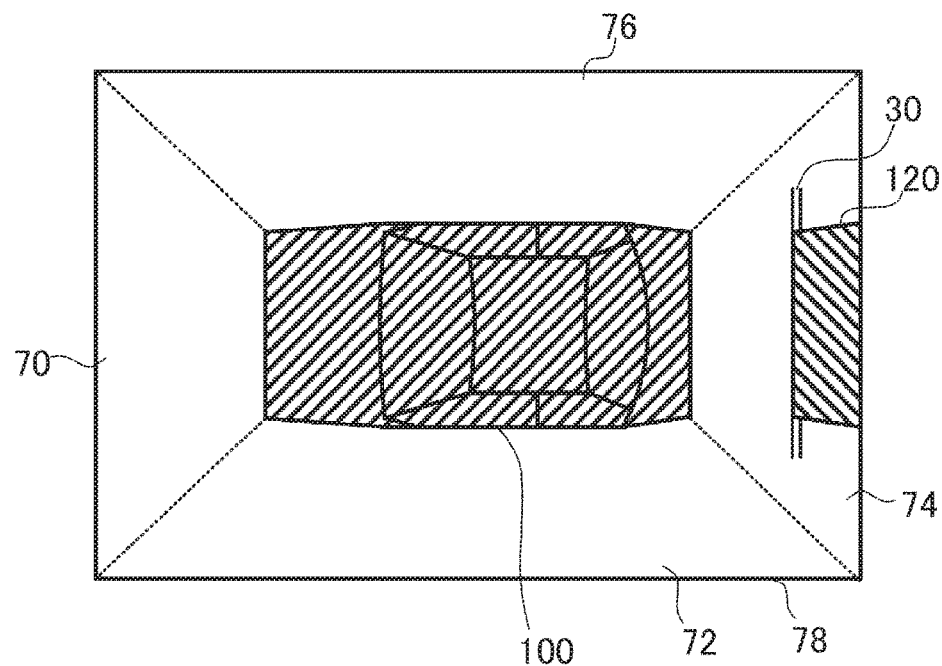
FIG. 18 shows an outline of the process in the vehicle display device of FIG. 17.

Instead of moving the other vehicle 110, the image processing unit 56 may paste a pseudo object 120 simulating the outer shape of the object onto the pattern. FIG. 18 shows an outline of the process in the vehicle display device 50. The pseudo object 120 may be a graphic as illustrated instead of an image of the other vehicle 110. The size of the pseudo object 120 is configured to be equal to or larger than that of the other vehicle 110. The pseudo object 120 may also be used in Embodiment 2.

Since the pattern is hidden from view after transforming the viewpoint according to this embodiment, the frame border that should be hidden from view by the other vehicle in the bird's-eye image is prevented from being displayed. Further, since the pseudo object simulating the outer shape of the object is pasted and superimposed on the pattern, the process is simplified.

Embodiments 2, 3 are described above as being applied to the rear image 74 captured by the rear imaging unit 16, but can also be applied to the front image 70 captured by the front imaging unit 12, the left image 72 captured by the left imaging unit 14, and the right image 76 captured by the right imaging unit 18. Application of the embodiments to the rear image 74 captured by the rear imaging unit 16 is useful when the vehicle is driven backward to park at a parking area. Application of the embodiments to the front image 70 captured by the front imaging unit 12 is useful when the vehicle is driven forward to park in a parking area. Application of the embodiments to the left image 72 captured by the left imaging unit 14 or the right image 76 captured by the right imaging unit 18 is useful when the vehicle is driven sideways by going back and forth for parking or when the vehicle passes by another vehicle in a narrow road.

Described above is an explanation based on an exemplary embodiment. The embodiment is intended to be illustrative only and it will be understood by those skilled in the art that various modifications to constituting elements and processes could be developed and that such modifications are also within the scope of the present invention.

What is claimed is:

1. A vehicle display device comprising:
    an image acquisition unit that acquires an image around a vehicle;
    a distance acquisition unit that acquires a first distance between a first object included in the acquired image and the vehicle;
    an image processing unit that processes the acquired image such that a distance to a second object located beneath the first object included in the acquired image is reflected, in accordance with the first distance acquired in the distance acquisition unit, by deleting the second object in the acquired image when the second object is positioned such that the second object is hidden from view by the first object in a view of the vehicle from above and is not hidden from view by the first object in the acquired image;
    a viewpoint transformation processing unit that subjects the acquired image thus processed to viewpoint transformation to produce a bird's-eye image as viewed from above the vehicle; and
    a display control unit that causes a display unit to display the bird's-eye image.

2. The vehicle display device according to claim 1, wherein
    the image processing unit processes the acquired image such that the distance to the second object located beneath the first object is reflected when the first distance is smaller than a first threshold value, by deleting the second object in the acquired image when the second object located beneath the first object is positioned such that the second object is hidden from view by the first object in a view of the vehicle from above and is not hidden from view by the first object in the acquired image.

3. The vehicle display device according to claim 2, wherein
    the image processing unit derives a second distance between the first object and the second object based on the first distance, and processes the acquired image such that the distance to the second object located beneath the first object is reflected when the derived second distance is smaller than a second threshold value, by deleting the second object in the acquired image when the second object located beneath the first object is positioned such that the second object is hidden from view by the first object in a view of the vehicle from above and is not hidden from view by the first object in the acquired image.

4. The vehicle display device according to claim 2, wherein
    the image processing unit defines the first threshold value and the second threshold value in accordance with a height of an imaging device that captures the acquired image from a ground.

5. The vehicle display device according to claim 1, wherein
    the first object is another vehicle, and
    the second object is a parking lot drawn on the ground or a parking lot placed on the ground.

6. The vehicle display device according to claim 1, wherein
    the image processing unit deletes a portion of the second object hidden from view by the first object from the acquired image depending on the first distance acquired in the distance acquisition unit.

7. The vehicle display device according to claim 1, wherein
    the image processing unit processes the acquired image such that the second object is deleted by being hidden from view by the first object from above, depending on the first distance acquired in the distance acquisition unit.

8. The vehicle display device according to claim 7, wherein
    the image processing unit deletes the second object by hiding the second object from view by the first object from above by cutting out an outer shape of the first object and then pasting and superimposing the outer shape on the second object in the acquired image.

9. The vehicle display device according to claim 8, wherein
    the image processing unit pastes the outer shape of the first object such that the first object is more toward a driver's vehicle than the second object in the acquired image.

10. The vehicle display device according to claim 7, wherein
    the image processing unit deletes the second object by hiding the second object from view by the first object by pasting and superimposing a pseudo object simulating an outer shape of the first object on the second object in the acquired image.

11. A vehicle display method comprising:
    acquiring an image around a vehicle;
    acquiring a first distance between a first object included in the acquired image and the vehicle;
    processing an image such that a distance to a second object located beneath the first object included in the acquired image is reflected, in accordance with the acquired first distance, by deleting the second object in the acquired image when the second object is positioned such that the second object is hidden from view by the first object in a view of the vehicle from above and is not hidden from view by the first object in the acquired image;
    subjecting the processed image thus processed to viewpoint transformation to produce a bird's-eye image as viewed from above the vehicle; and
    causing a display unit to display the produced bird's-eye image.

* * * * *